United States Patent
Shukla

(10) Patent No.: US 8,060,579 B2
(45) Date of Patent: Nov. 15, 2011

(54) USER LOCATION DEPENDENT DNS LOOKUP

(75) Inventor: Ashish Shukla, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 181 days.

(21) Appl. No.: 12/484,111

(22) Filed: Jun. 12, 2009

(65) Prior Publication Data

US 2010/0318631 A1    Dec. 16, 2010

(51) Int. Cl.
*G06F 15/16* (2006.01)
*G06F 12/00* (2006.01)

(52) U.S. Cl. ........................ 709/217; 709/245

(58) Field of Classification Search .......... 709/200–203, 709/217–219, 223–229, 245
See application file for complete search history.

(56) References Cited

U.S. PATENT DOCUMENTS

| | | | | |
|---|---|---|---|---|
| 6,760,775 B1 * | 7/2004 | Anerousis et al. | ............ | 709/238 |
| 7,310,686 B2 * | 12/2007 | Uysal | ............ | 709/245 |
| 7,487,230 B2 * | 2/2009 | Gu et al. | ............ | 709/220 |
| 2006/0029104 A1 * | 2/2006 | Jungck | ............ | 370/498 |
| 2006/0075139 A1 * | 4/2006 | Jungck | ............ | 709/245 |
| 2008/0281699 A1 * | 11/2008 | Whitehead | ............ | 705/14 |

* cited by examiner

*Primary Examiner* — Zarni Maung
(74) *Attorney, Agent, or Firm* — Martine Penilla Group, LLP

(57) ABSTRACT

A system and method which may directly resolve a URL into the IP address of a web server running a regional website of a web service provider based on a user's geographic location. A user may type a URL of a website in his browser. A user location analyzer may decide the user's geographic location according to his IP address. With the user's geographic location, a DNS server may resolve the URL to a regional website of a web service provider which provides services specific to the user's geographic location. Consequently, the user may be presented a regional website of a web service provider without delays caused by re-directing, and save the user's time and effort to look for a regional website himself.

18 Claims, 3 Drawing Sheets

USER LOCATION DEPENDENT DNS LOOKUP

BACKGROUND

1. Field of the Invention

The present invention relates generally to DNS (Domain Name System) lookups, and more particularly to determining an IP address according to a user's geographic location.

2. Description of Related Art

Nowadays, some web service providers provide regional websites for various countries/regions in addition to a general website, and each regional website may provide services in which users in that country/region are more interested and which may use a language popular in that country/region. For example, Yahoo! provides a general website Yahoo! corresponding to a URL www.yahoo.com, and regional websites Yahoo! Italy corresponding to a URL it.yahoo.com to users in Italy, and Yahoo! Singapore corresponding to a URL sg.yahoo.com to users in Singapore.

The URL www.yahoo.com is static and always resolves to Yahoo!'s general website, i.e., Yahoo! (which is also Yahoo! US corresponding to URL us.yahoo.com), irrespective of the requesting user's geographic location. To load a regional website, e.g., Yahoo! Italy, a user may have to type the URL for the regional website it.yahoo.com. Less technical savvy users may not know the URL for a regional website. If a user types in www.yahoo.com, he may be directed to the general website Yahoo! even though the user is in Italy. In addition, since www.yahoo.com uses English, a user who does not speak English may not be able to figure out how to go to it.yahoo.com from www.yahoo.com, and may simply give up. Consequently, the web service provider may lose users.

Sometimes users may only know the name of a company, but do not know the URL of its website. If a user searches for the website of this company, he may be directed to the general website of the company and may face the same problem. The company may lose potential customers in this scenario.

With currently available technologies, a web service provider may redirect a user from its general website to one of its regional websites according to the user's geographic location. FIG. 1 illustrates a currently available system for redirecting a user to a regional website of a web service provider. As shown, a web service provider, e.g., Yahoo!, may have a number of associated web servers 104a, 104b and 104c, each of which may run a website of the web service provider. For example, the web server 104a may run a general website www.yahoo.com, a web server 104b may run a regional website for Italy it.yahoo.com, and a web server 104c may run a regional website for Singapore sg.yahoo.com.

A user in Italy may type the URL of the general website of a web service provider Yahoo!, i.e., www.yahoo.com, into the address bar of his web browser 101.

A DNS (Domain Name System) server 102 may receive the URL request via a network 103, e.g., the Internet. A DNS server is used to translate a URL into an IP address. An IP address is a group of numbers for identifying a web server on the Internet, and is used by networking equipment for information delivery. For example, the IP address of the web server for www.yahoo.com is 66.94.234.13. Since it is easier to remember names than to remember long numbers, users may use a name of a web server, e.g., www.yahoo.com, when communicating with computer systems.

The DNS server 102 may resolve the URL www.yahoo.com from the web browser 101 into the IP address of a web server 104a which runs the general website www.yahoo.com of the web service provider Yahoo!, and the user's computer and the web server 104a may be connected. The web server 104a may determine from the user's IP address that the user is in Italy, and connect the user's computer with an associated web server 104b which runs Yahoo!'s regional website for Italy it.yahoo.com. As a result, the user may be redirected to Yahoo!'s regional website for Italy.

Since the system shown in FIG. 1 resolves the URL from the user to an IP address without considering the user's location, and then redirects the user to a regional website, it may cause delays. Therefore, it may be desirable to provide a system and method which may resolve a high level domain to a website based on a user's geographic location.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method which may directly resolve a URL into the IP address of a web server running a regional website of a web service provider based on a user's geographic location. A user may type a URL of a website in his browser. A user location analyzer may decide the user's geographic location according to his IP address. With the user's geographic location, a DNS server may resolve the URL to a regional website of a web service provider which provides services specific to the user's geographic location. Consequently, the user may be presented a regional website of a web service provider without delays caused by re-directing, and save the user's time and effort to look for a regional website himself. Advantages of the present invention will become apparent from the following detailed description.

Figure 1:
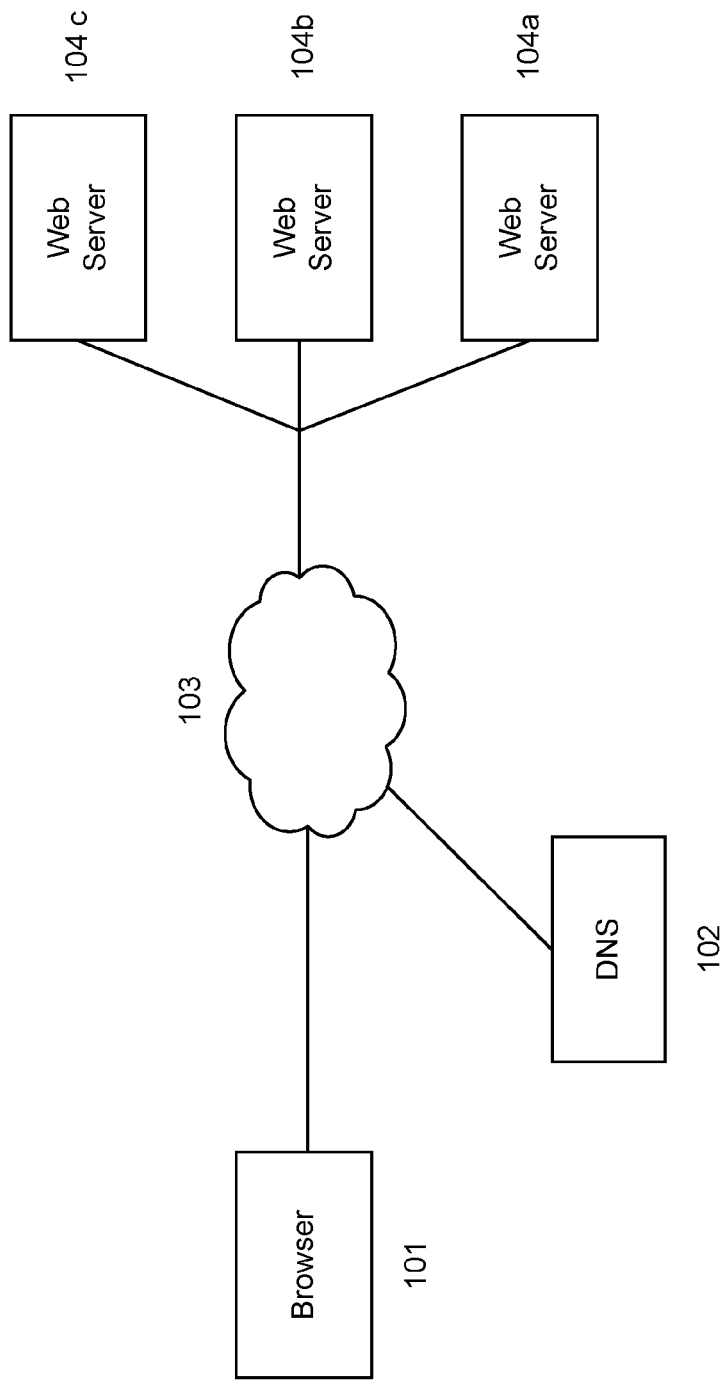
FIG. 1 illustrates a currently available system for re-directing a user to a regional website of a web service provider.
Figure 2:
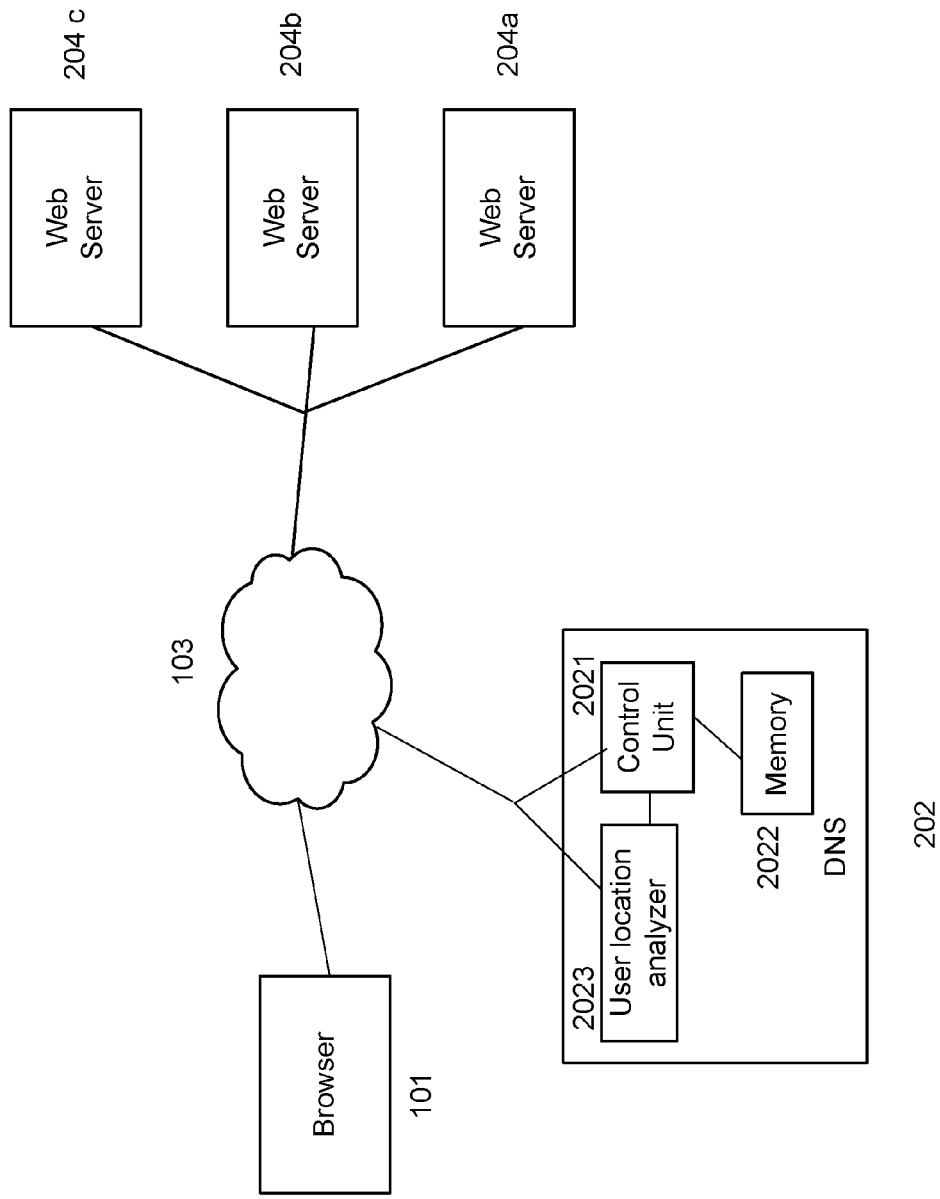
FIG. 2 illustrates a system for resolving a URL into an IP address based on a user's geographic location according to one embodiment of the present invention.

FIG. 2 illustrates a system for resolving a URL into an IP address based on a user's geographic location according to one embodiment of the present invention. Similarly to the system shown in FIG. 1, a web service provider, e.g., Yahoo!, may have a number of associated web servers 204a, 204b and 204c, each of which may run a website of the web service provider. For example, the web server 204a may run a general website www.yahoo.com, a web server 204b may run a regional website for Italy it.yahoo.com, and a web server 204c may run a regional website for Singapore sg.yahoo.com. A browser 101 may receive a URL from a user. The URL may be, e.g., www.yahoo.com, and the user may be in, e.g., Italy.

A DNS server 202 may receive a URL from a user via a network, e.g., the Internet 103, and translate it into an IP address of a web server running a regional website specific to the user's geographic location. The DNS 202 server may include a control unit 2021, a memory 2022, and a user location analyzer 2023.

The user location analyzer 2023 may obtain information about a user's geographic location, and provide such information to the control unit 2021. In addition to the URL a user typed in his browser, a URL request from the user's computer may also include the IP address of the user's computer. The distribution of IP addresses is geographic location dependent. If the user travels abroad with his computer and accesses the Internet where he is located temporarily (as compared, for example, to accessing a dial-up connection in his home country), his computer will have an IP address in the country/region he travels to. Thus, in one embodiment, the user location analyzer 2023 may obtain the user's geographic location from the IP address in the URL request from the user's computer. The memory 2022 may store names of a number of web servers (e.g., URLs), an IP address for each of the web servers, and a service area of each of the web servers. For example, for the URL it.yahoo.com, the memory 2022 may store its service area "Italy" and its IP address; for the URL www.yahoo.com, the memory may store its service area "worldwide" and its IP address; for the URL sg.yahoo.com, the memory may store its service area "Singapore" and its IP address. In one embodiment, a web server's name, IP address and service area may be stored as one record in a database.

The control unit 2021 may receive the URL from the browser 101 and obtain identity information of the web service provider, e.g., "yahoo" in the URL www.yahoo.com. The control unit 2021 may also receive the geographic location of the user from the user location analyzer 2023. The control unit 2021 may then search the memory 2022 for an IP address of a web server which is associated with the web service provider and provides services specific to the user's geographic location. In one example, if the control unit 2021 receives the URL www.yahoo.com from the browser 101 and "Italy" from the user location analyzer 2023, it may search the memory 2022 with both "Yahoo" and "Italy" and obtain the IP address of the web server 204b running Yahoo!'s Italy regional website it.yahoo.com, and forward the IP address to other network equipment as the IP address corresponding to the user's URL request. As a result, a page of the regional website it.yahoo.com may be presented to the user, although the URL from the user is www.yahoo.com.

In one example, if the control unit 2021 receives the URL www.yahoo.com from the browser 101 and "Greece" from the user location analyzer 2023, it may search the memory 2022 with both "Yahoo" and "Greece." Since there is not a Yahoo regional website specific to Greece, the control unit 2021 may forward the IP address of the web server 204a running the general website www.yahoo.com to other network equipment, since www.yahoo.com provides worldwide services.

In one example, a user lives in Italy may travel to Singapore. The control unit 2021 may receive the URL www.yahoo.com from the browser 101 and "Singapore" from the user location analyzer 2023, and may search the memory 2022 with "Yahoo", and "Singapore." The control unit 2021 may obtain an IP address for Yahoo! Singapore, and may forward the IP address to other network equipment. If the user wants to visit Yahoo! Italy, he may type in the URL it.yahoo.com to get to that regional website.

Figure 3:
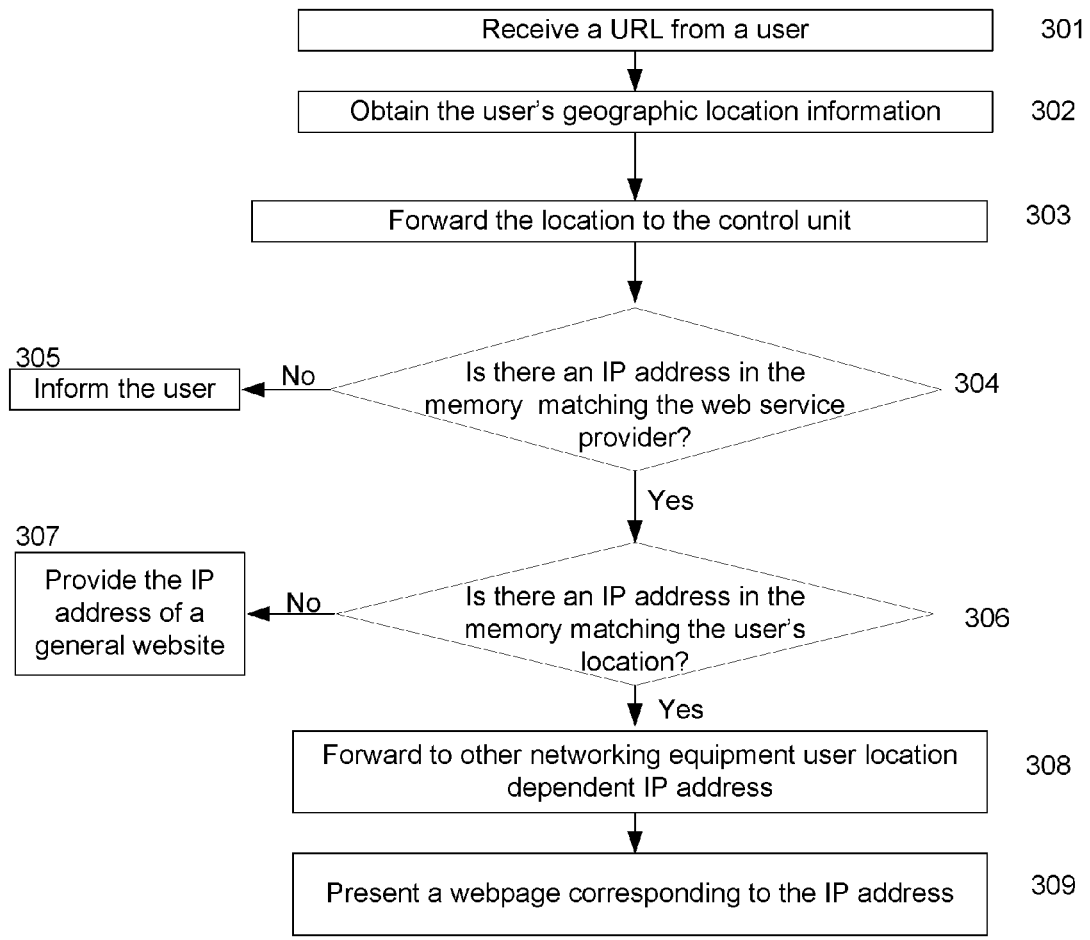
FIG. 3 illustrates a flow chart of a method for resolving a URL into an IP address based on a user's geographic location according to one embodiment of the present invention.

FIG. 3 illustrates a flow chart of a method for resolving a URL into an IP address based on a user's geographic location according to one embodiment of the present invention. The method may be used in the system shown in FIG. 2.

At 301, a user may type a URL in his browser. The URL may be, for example, www.yahoo.com, and the user may reside in Italy.

At 302, the user location analyzer 2023 in the DNS server 202 may obtain the user's location information from the URL request. As discussed above, the user location analyzer 2023 may obtain the user's location information from the IP address of the user's computer.

At 303, the user location information may be forwarded to the control unit 2021.

At 304, the control unit 2021 may search the memory 2022 with the identity information of the web service provider, e.g., "Yahoo" in the URL from the user, and the location information from the user location analyzer 2023, e.g., "Italy."

If there is not a match for the URL, at 305, the control unit 2021 may information the user and ask the user to check whether the URL he typed in is correct. Otherwise, the procedure may proceed to 306.

At 306, it may be determined whether there is a match for the user's location. If not, at 307, the IP address of a general website, i.e., www.yahoo.com, may be sent to other networking equipment, so that a page of the general website www.yahoo.com may be presented to the user.

If there is a match for the user's location or locations, at 308, the control unit 2021 may forward to other networking equipment the IP address(es) of web server(s) covering the user's location. For example, if the user location analyzer 2023 provides "Italy" as the user's location, the IP address for the web server 204b running the regional website for Italy it.yahoo.com may be provided as the IP address.

Although 304 and 306 are shown separately, they may be performed simultaneously.

At 309, the web server 204b corresponding to the IP address from the DNS server 201 may be connected to the user's computer, so that a webpage of the regional website for Italy it.yahoo.com may be presented to the user.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of translating a name of a web server into an IP address, wherein the Web server is one of a plurality of web servers associated with a web service provider and wherein each of the web servers runs a regional or general website of the web service provider, the method comprising:
    storing an IP address of a web server together with the geographic region its services are specific to in memory of a domain name system (DNS) server;
    receiving a user request for accessing a first web server associated with the web service provider at the DNS server, wherein the user request includes identity information of the web service provider;
    obtaining the user's geographic location at the DNS server; and
    searching with the identity information of the web service provider and the user's geographic location in the memory of the DNS server to determine an IP address of a web server which is associated with the web service provider and runs a regional website providing services specific to the user's geographic location.

2. The method of claim 1, further comprising: providing an IP address of a web server running a general website of the web server provider when there is no match for the user's geographic location.

3. The method of claim 1, wherein the user request is a URL request.

4. The method of claim 1, wherein the user's geographic location is obtained from the user request.

5. The method of claim 4, wherein the user's geographic location is obtained from the user's IP address.

6. An apparatus for translating a name of a web server into an IP address, wherein the web server is one of a plurality of web servers associated with a web service provider and wherein each of the web servers runs a regional or general website of the web service provider, the apparatus comprising:
- a memory of a domain name system (DNS) server for storing a plurality of IP addresses, wherein each of the IP addresses is stored together with a geographic region its services are specific to;
- a user location analyzer executed at the DNS server for obtaining a user's geographic location; and
- a control unit of the DNS server for receiving a user's request for accessing a first web server associated with the web service provider, and searching the memory for an IP address of a web server associated with the web service provider and matching the user's geographic location.

7. The apparatus of claim 6, wherein the user request includes identity information of the web service provider.

8. The apparatus of claim 7, wherein the control unit searches the memory with the user's geographic location and the identity information of the web service provider.

9. The apparatus of claim 6, wherein the control unit provides an IP address of a general website of the web service provider when there is no match for the user's geographic location in the memory.

10. The apparatus of claim 9, wherein the user request is a URL request.

11. The apparatus of claim 9, wherein the user's geographic location is obtained from the user request.

12. The apparatus of claim 9, wherein the user's geographic location is obtained from the user's IP address.

13. A Non-transitory computer program product comprising a computer-readable medium having instructions which, when performed by a computer, perform a method of translating a name of a web server into an IP address, wherein the web server is one of a plurality of web servers associated with a web service provider and wherein each of the web servers runs a regional or general website of the web service provider, the method comprising:
- receiving at a domain name service (DNS) server a user request for accessing a first web server of the web service provider, wherein the user request includes identity information of the web service provider;
- obtaining the user's geographic location at the DNS server; and
- searching at the DNS server for an IP address with the identity information and the user's geographic location.

14. The computer program product of claim 13, further comprising:
- providing an IP address of a web server running a general website of the web server provider when there is no match for the users geographic location.

15. The computer program product of claim 13, wherein the user request is a URL request.

16. The computer program product of claim 13, wherein the users geographic location is obtained from the user request.

17. The computer program product of claim 13, wherein the users geographic location is obtained from the user request.

18. The computer program product of claim 17, wherein the users geographic location is obtained from the user's IP address.

* * * * *